United States Patent
Chrobaczek et al.

(10) Patent No.: US 6,815,493 B2
(45) Date of Patent: Nov. 9, 2004

(54) MIXTURES OF POLYSILOXANE EMULSIONS

(75) Inventors: Harald Chrobaczek, Augsburg (DE); Michael Geubtner, Langweid a. Lech (DE); Ralf Goretzki, Stadtbergen (DE); Günther Tschida, Schwabmünchen (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/332,967

(22) PCT Filed: Jul. 11, 2001

(86) PCT No.: PCT/EP01/08000

§ 371 (c)(1),
(2), (4) Date: Jan. 14, 2003

(87) PCT Pub. No.: WO02/06403

PCT Pub. Date: Jan. 24, 2002

(65) Prior Publication Data

US 2003/0149117 A1 Aug. 7, 2003

(30) Foreign Application Priority Data

Jul. 18, 2000 (DE) .......................................... 100 34 831

(51) Int. Cl.$^7$ ................................................. C08K 3/20

(52) U.S. Cl. ..................................... 524/588; 8/DIG. 1

(58) Field of Search ......................... 524/588; 8/DIG. 1

(56) References Cited

U.S. PATENT DOCUMENTS

| 4,620,878 A | 11/1986 | Gee ........................ 106/287.15 |
| 5,057,572 A | 10/1991 | Chrobaczek et al. ........ 524/588 |
| 5,310,783 A | 5/1994 | Bernheim et al. .......... 524/837 |
| 5,525,427 A * | 6/1996 | Griswold et al. ........... 428/447 |
| 5,540,952 A | 7/1996 | Canivenc et al. ........... 427/387 |
| 5,573,694 A | 11/1996 | Danner ...................... 252/8.63 |
| 5,612,409 A | 3/1997 | Chrobaczek et al. ........ 524/838 |
| 5,688,889 A | 11/1997 | Canivenc et al. ............. 528/40 |
| 5,707,435 A * | 1/1998 | Halloran ................ 106/287.11 |
| 6,042,615 A * | 3/2000 | Habereder et al. ............. 8/102 |

FOREIGN PATENT DOCUMENTS

| DE | 3929757 | 3/1991 |
| DE | 10016610 | 10/2001 |
| EP | 0327321 | 8/1989 |
| EP | 0441530 | 8/1991 |
| EP | 0978586 | 2/2000 |

OTHER PUBLICATIONS

Chemical Abstract 132:138752 for EP 978586 (2000).

* cited by examiner

*Primary Examiner*—Margaret G. Moore
(74) *Attorney, Agent, or Firm*—Kevin T. Mansfield

(57) ABSTRACT

Internal softness and surface smoothness are obtainable for textiles on treating them with a composition containing amino-functional polyorganosiloxanes. The composition may be prepared by simply mixing two separately prepared polysiloxane emulsions. Each emulsion contains an amino-functional polyorganosiloxane having a certain minimum content of nitrogen. One of the two separately prepared emulsions is a macroemulsion, the other a microemulsion.

13 Claims, No Drawings

MIXTURES OF POLYSILOXANE EMULSIONS

This invention concerns compositions preparable by mixing two different dispersions of amino-functional polyorganosiloxanes. It further concerns the use of such compositions for treating fiber materials.

It is known to treat fiber materials, especially textile fabrics in the form of wovens, knits or nonwovens, with aqueous dispersions of polyorganosiloxanes. This treatment frequently forms part of the textile finishing stage. Judicious choice of the polyorganosiloxanes used will provide water-repellent properties and a pleasantly soft hand on the fiber materials. Especially polyorganosiloxanes containing moieties with amino groups will provide a soft hand. A particular advantage lies in the use of microemulsions. Microemulsions are transparent with a bluish to clear appearance and frequently contain the polyorganosiloxanes in the form of smaller particles than macroemulsions. While macroemulsions constitute a milkily turbid system, microemulsions are transparent to slightly opalescent.

Dispersions of amino-functional polyorganosiloxanes, their preparation and their use for treating textiles are known and described inter alia in U.S. Pat. Nos. 5,540,952 and 5,688,889 and also EP-A 441 530. The preparation and use of microemulsions of amino-functional polyorganosiloxanes is revealed in U.S. Pat. No. 4,620,878. A particularly suitable process for preparing such microemulsions is disclosed in U.S. Pat. No. 5,057,572.

EP-A 978 586 describes aqueous microemulsions containing an amino-functional polyorganosiloxane and a nonnitrogenous polyorganosiloxane. The reference states that such microemulsions are capable of providing fiber materials finished therewith not only with a smooth surface but also with "internal softness". It would be desirable, according to the reference, to combine microemulsions of amino-functional polyorganosiloxanes with macroemulsions of dimethylpolysiloxane by mixing, but this fails because of the instability of the mixtures obtained.

It is an object of the present invention to provide aqueous polyorganosiloxane compositions that are preparable by simply mixing two separately prepared polyorganosiloxane dispersions and that confer not only a very pleasant internal softness but also a very smooth surface on textile fiber materials.

This object is achieved by a composition obtainable by combining a first aqueous dispersion A), which contains an amino-functional polyorganosiloxane, with a second aqueous dispersion B), which contains an amino-functional polyorganosiloxane, said polyorganosiloxane in said dispersion A) having a nitrogen content of at least 0.1% by weight and said polyorganosiloxane in said dispersion B) having a nitrogen content of at least 0.01% by weight, said dispersion A) being a microemulsion and said dispersion B) being a macroemulsion.

It was surprisingly found that simply mixing said dispersion A) with said dispersion B) provides a stable composition in the form of an aqueous dispersion. Such a composition provides not only an excellent internal softness, i.e., a very pleasantly soft hand, but also a very smooth surface on fiber materials treated therewith. This is believed to be because dispersion A) is a microemulsion which has small particles that are capable of penetrating into the fiber structure and lead to the soft hand, whereas macroemulsion B) has larger particles that remain behind on the surface of the fiber material. The exclusive use of amino-functional polyorganosiloxanes provides an even softer hand on textile fiber materials treated therewith than the additional use of a nonnitrogenous polysiloxane as described in EP-A 978 586.

To obtain the advantages described, dispersion A) must be a microemulsion. Only that will provide polyorganosiloxane particles small enough to be able to penetrate into the interior of the fiber material.

The polyorganosiloxane in the aqueous dispersion A) (microemulsion) must have a nitrogen content (reckoned as N) of at least 0.1% by weight. It has been determined that a lower nitrogen content will not provide suitable microemulsions, especially with regard to the stability of the emulsion.

By contrast, the polyorganosiloxane in the aqueous dispersion B) (macroemulsion) may have a lower nitrogen content. But the nitrogen content must be at least 0.01% by weight of N.

The polyorganosiloxane in dispersion A) can be the same as that in dispersion B), provided its nitrogen content is at least 0.1% by weight. Preferably, however, the polyorganosiloxane of dispersion A) has a higher nitrogen content than that of dispersion B), especially an at least 10% higher nitrogen content. For instance, the polysiloxane of dispersion B) may contain 0.3% by weight of N and that of dispersion A) 0.4% by weight of N, i.e., a 33% higher content.

In a further preferred-embodiment of compositions according to the invention, said polysiloxane of said dispersion A) has a nitrogen content of 0.1 to 1.5% by weight and said polyorganosiloxane of said dispersion B) has a nitrogen content of 0.01 to 1.5% by weight preferably of 0.01 to 1.3% by weight of N.

The aforementioned values of respectively 0.1% by weight and 0.01% by weight for the minimum nitrogen content are based on the total nitrogen present in the polyorganosiloxane of dispersion A) and in the polyorganosiloxane of dispersion B) respectively, regardless of whether these polysiloxanes contain only a single amino group or additionally further nitrogenous groups.

Compositions according to the invention are obtainable in a simple manner by combining a separately prepared microemulsion with a separately prepared macroemulsion. This makes it possible to prepare compositions according to this invention that do not have the stability problems described in EP-A 978 586.

Preferably not only the polysiloxane in dispersion A) but also that in dispersion B) is a polymer having an unbranched polysiloxane chain, i.e., substituents attached to the silicon atoms of the chain preferably do not contain any further silicon atoms.

In a further preferred embodiment in the polysiloxane of both said dispersion A) and said dispersion B) all silicon atoms in the chain other than the two terminal silicon atoms have attached to them only methyl groups or radicals that contain one or more amino groups. Normally not only in dispersion A) but also in dispersion B) every silicon atom sites at least one alkyl radical of 1 to 6 carbon atoms, preferably a methyl radical. Some of the silicon atoms within the chain may site two such alkyl radicals. However, at least one silicon atom in the chain must site a radical containing one or more amino groups; only in this case will an amino-functional polysiloxane be present for the purposes of the invention. This radical, containing one or more amino groups, is preferably an X radical of the hereinbelow specified kind. All alkyl radicals mentioned here are preferably methyl groups. The two silicon atoms at the ends of the polysiloxane chain may independently—not only in the case of dispersion A) but also in the case of dispersion B)—each possess three alkyl groups, especially three methyl groups or two alkyl groups, especially two methyl groups and one hydroxyl group or an OR group as substituents, in which case R is an alkyl radical of 1–14 carbon atoms, preferably a methyl radical. It is particularly preferable for the polysiloxane in dispersion B) to be an aminofunctional α,ω-dihydroxypolyorganosiloxane and/or for the polysiloxane of dispersion A) to be an amino-functional α,ω-trimethylsilylpolyorganosiloxane.

The polyorganosiloxanes of dispersion A) and dispersion B) may have the same or different chemical structures. But, in accordance with the statement made above and in claim 1, they must have a certain minimum content of nitrogen. Preferably either or both of the polyorganosiloxanes used for A) and B) has a structure of the general formula (I)

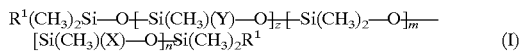

(I)

where the individual —Si(CH$_3$)(Y)—(O)—, —Si(CH$_3$)$_2$—O— and —Si(CH$_3$)(X)—O— units may have any distribution over the polysiloxane chain, the two R$^1$ radicals are independently OH, R or OR, where R is an alkyl radical of 1 to 6 carbon atoms or a phenyl radical, m, n and z are such that said amino-functional polyorganosiloxane in said dispersion A) has a nitrogen content of at least 0.1% by weight and said amino-functional polyorganosiloxane in said dispersion B) has a nitrogen content of at least 0.01% by weight, Y is a radical of the formula

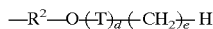

where R$^2$ is a divalent branched or unbranched alkylene radical of 1 to 6 carbon atoms, d is from 5 to 25, e is 0 or 1, and 60 to 100% of all T radicals present represent —CH$_2$CH$_2$—O— and 0 to 40% of all T radicals present represent

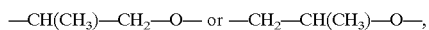

X is a monovalent organic radical that contains one or more amino groups, n is greater than 0 and z is from 0 to m−1.

In a preferred embodiment of compositions according to the invention, m in the formula (I) of said polyorganosiloxane in said dispersion A) is at least 20, the m:n ratio is in the range from 20:1 to 150:1 and the m:z ratio is in the range from 20:1 to 500:1 and/or wherein m in said polyorganosiloxane in said dispersion B) is at least 70, the m:n ratio is in the range from 70:1 to 200:1 and the m:z ratio is in the range from 20:1 to 1000:1. But it is also possible to obtain very good results when z=0, i.e., when there are no Y radicals in the polysiloxane.

The X radical in this formula (I) is preferably selected from radicals of the general formulae (II) to (VII)

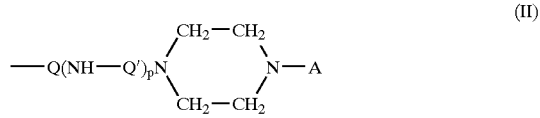

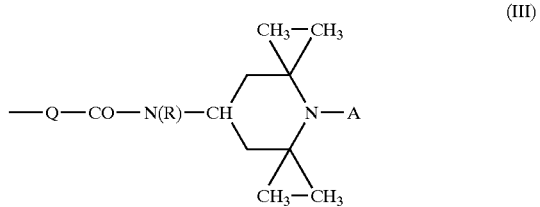

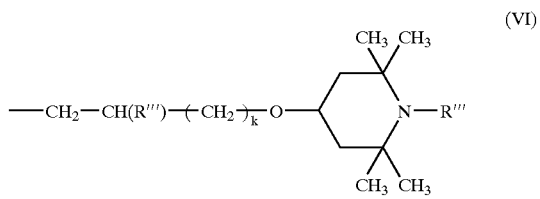

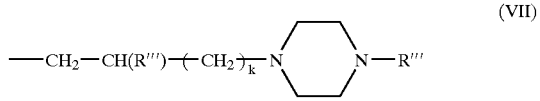

where the nitrogenous radicals of these formulae may also be quaternized with an alkyl group of 1 to 8 carbon atoms at one or more of the nitrogen atoms, R is as defined in claim 12, R''' is H or CH$_3$, k is from 0 to 6, preferably 1, t is from 2 to 8, preferably 2 to 4, l is from 0 to 3, preferably 0 or 1, R$^4$ is H, —CO—CH$_3$, —CO—(CH$_2$)$_k$OH, —CH$_2$—(CH$_2$)$_k$CH$_3$ or cyclohexyl, A is hydrogen or an alkyl group of 1 to 4 carbon atoms, Q and Q' are each a divalent branched or unbranched alkylene radical of 1 to 4 carbon atoms, p is =0 or 1, and all the Z radicals present are independently hydrogen, an alkyl radical of 1 to 6 carbon atoms with or without one or more hydroxyl groups as substituents, cyclohexyl or the —CO—G radical, where G is an aliphatic radical of 1 to 6 carbon atoms with or without one or more hydroxyl groups as substituents.

Particular preference for compositions according to the invention is given to polyorganosiloxanes of the formula (I) mentioned above and in claim 12 where X is a radical of the formula (IV) or (V), especially a radical of the formula —(CH$_2$)$_3$NH—(CH$_2$)$_2$NH$_2$ or of the formula —(CHR$^a$)$_3$NH$_2$, where one of the R$^a$ radicals is CH$_3$ and the other two are each H or of the formula —(CH$_2$)$_3$NH$_2$. Such polysiloxanes are very useful not only for preparing the microemulsion (component A)) but also for preparing the macroemulsion (component B)) as well as for both emulsions.

Useful amino-containing X radicals are described in U.S. Pat. No. 5,057,572, EP-A 441 530, U.S. Pat. Nos. 5,310,783, 4,620,878, EP-A 578 144 and in German patent application 100 16 610.5 (filed Apr. 4, 2000). Further radicals useful as X are disclosed in U.S. Pat. Nos. 5,688,889 and 5,540,952.

Amino-functional polysiloxanes of the formula (I) with polyoxyalkylene groups (z not 0) are described in EP-A 578 144. The polysiloxanes recited therein are useful for both dispersion A) and dispersion B) of the present invention, provided they have the respectively required, abovementioned minimum content of nitrogen. Also suitable are polysiloxanes that are derived from the amino-functional polysiloxanes mentioned by virtue of the fact that one or more nitrogen atoms have been quaternized, for example with alkyl groups.

Both the polysiloxanes of dispersion A) and the polysiloxanes of dispersion B) may on average contain either just one or else plural silicon atoms to which amino-containing radicals, for example the X radicals mentioned, are attached. In particularly useful polysiloxanes the ratio $V=Z_N/Z_A$ is in the range from 1:20 to 1:200, where $Z_N$ is the number of silicon atoms to which amino-containing radicals are attached and $Z_A$ is the number of silicon atoms to which no nitrogenous radicals are attached.

Dispersion A) must be a microemulsion. Dispersion B) is a macroemulsion. Microemulsions of amino-functional polyorganosiloxanes are preparable by known methods. A suitable method is described in U.S. Pat. No. 4,620,878 for example. A particularly useful process for preparing microemulsions useful as dispersion A) comprises heating a mixture containing 3 to 25 parts by weight of a water-soluble dispersant and 5 to 96.85 parts by weight of water to a temperature of at least 50° C. to form a homogeneous phase and adding to said mixture before or after said heating 0.1 to 84 parts by weight of an amino-functional polyorganosiloxane and 0.05 to 3.05 parts by weight of an acid, preferably a low molecular weight organic acid.

This process is detailed in U.S. Pat. No. 5,057,572, where suitable dispersants or emulsifiers are mentioned as well. The emulsifiers mentioned there are suitable for preparing dispersions A) and/or B) of the invention even when the method of preparation used is not that of U.S. Pat. No. 5,057,572.

An amino-functional polyorganosiloxane macroemulsion useful as dispersion B) in the invention is preparable by generally known methods for preparing silicone emulsions.

Dispersion A) and dispersion B) are very usefully preparable according to the present invention by using nonionic dispersants, for example ethoxylated fatty alcohols. Further useful dispersants are described in the literature, for example the patent documents cited above.

Amino-functional polyorganosiloxanes useful for preparing dispersions A) and B) are commercially available, for example from Wacker and Dow Corning.

The compositions according to the invention may contain, besides the components from dispersions A) and B), further components which were subsequently added to the compositions after dispersions A) and B) were combined. Such further components may be products that are customary for textile finishing.

Compositions according to the invention preferably contain no nonnitrogenous polysiloxanes. Compositions according to the invention may be prepared by simply mixing the separately prepared dispersions A) and B) at room temperature or at a slightly elevated temperature by mechanical stirring.

Preferably dispersion A) contains 4 to 40% by weight of amino-functional polyorganosiloxane and 0 to 40% by weight of a dispersant or dispersant mixture. Preferably dispersion B) contains 10 to 60% by weight of amino-functional polyorganosiloxane and 0 to 10% by weight of a dispersant or dispersant mixture.

Compositions according to the invention that are particularly useful for textile finishing are obtainable when said dispersion A) and said dispersion B) are combined in such amount ratios that the composition obtained contains 0.3 to 3 parts by weight of polyorganosiloxane from said dispersion B) per part by weight of polyorganosiloxane from said dispersion A).

Compositions according to the invention are very useful for treating fiber materials, especially textile fabrics in the field of textile finishing. The fabrics may be wovens, knits or nonwovens. They preferably comprise cellulose, especially cotton, synthetic fibers or blends of fibers.

Compositions according to the invention may be applied to the textiles by generally known methods, for example via a pad-mangle. For this, the compositions according to the invention are diluted to concentrations customary for padding. After pad-mangling, the textiles are dried and further processed in a customary, generally known manner. The add-on of compositions according to the invention may vary in the range that is generally customary for silicone finishing.

It will be advantageous in a number of cases for the microemulsion (component A)) and the macroemulsion (component B)) to be prepared separately and to be combined with each other only after dilution to the concentration customarily desired for textile finishing, for example to the concentration of the padding liquor; alternatively, components A) and B) may be prepared separately and introduced directly into the apparatus envisioned for the textile treatment, for example padding, in which case this apparatus will already contain an initial charge of water and any further components, so that the contemplated padding liquor has the desired concentration following addition of A) and B).

The examples which follow illustrate the invention.

EXAMPLE 1 (INVENTIVE)

105 g of an aminoethylaminopropyl-functional organopolysiloxane (DOW CORNING Q2-8099), which had a nitrogen content of 0.27% by weight, were subjected to a shear emulsification with 12 g of an alkyl ethoxylate of 10–12 carbon atoms and 6 ethylene oxide units, 181 g of water and 1.8 g of acetic acid to form a milky macroemulsion (dispersion B).

55 g of an aminopropyl-functional organopolysiloxane (DOW CORNING X2-8630), which had a nitrogen content of 0.36% by weight, were subjected to the microemulsifying method of EP 358 652 together with 35 g of an isotridecyl ethoxylate of 7 ethylene oxide units, 20 g of dipropylene glycol and 180 g of water to form a clear microemulsion (dispersion A).

Dispersion A was stirred into dispersion B and the mixture was homogenized for 10 minutes. This produced a milky, opalescent emulsion which did not separate in the course of 3 months storage at 40° C.

EXAMPLE 2 (COMPARATIVE)

100 g of a nonnitrogenous polydimethylsiloxane having terminal trimethylsilyl groups and a viscosity of 2000 mpa.s were subjected to a shear emulsification with 15 g of an alkyl ethoxylate of 10–12 carbon atoms and 6 ethylene oxide units and 180 g of water to form a milky macroemulsion.

Dispersion A of Example 1 was stirred into this macroemulsion and the mixture was homogenized for 10 minutes. The result was a macroemulsion.

Use Example

The emulsions of Example 1 and Example 2 were used to make up liquors having a concentration of 30 g/l, with which a cotton twill (200 g/m$^2$) was padded, squeezed off to a wet pick-up of about 80% and dried at 110° C. for 10 minutes. The finish obtained with the product of Example 1 exhibited not only substantially higher surface smoothness but also a higher internal softness than the finish obtained with the product of Example 2.

What is claimed is:

1. A composition obtained by combining a first aqueous dispersion A), which contains an amino-functional polyorganosiloxane, with a second aqueous dispersion B), which contains an amino-functional polyorganosiloxane, said polyorganoslioxane in said dispersion A) having a nitrogen content of 0.1% to 1.5% by weight and said polyorganosiloxane in said dispersion B) having a nitrogen content of 0.01% to 1.3% by weight, wherein said amino-functional polyorganosiloxane in said dispersion A) has a nitrogen content at least 10% higher than said polyorganosiloxane in said dispersion B), and wherein said dispersion A) and said dispersion B) are combined in such amount ratios that the composition obtained contains 0.3 to 3 parts by weight of polyorganosiloxane from said dispersion B) per part by weight of polyorganosiloxane from said dispersion A), said dispersion A) being a microemulsion and said dispersion B) being a macroemulsion.

2. A composition as claimed in claim 1 wherein said dispersion B) contains an amino-functional αω-dihydroxypolyorganosiloxane.

3. A composition as claimed in claim 1 wherein said dispersion A) contains an amino-functional polyorganosiloxane having trimethylsilyl end groups.

4. A composition as claimed in claim 1 wherein said dispersion A) contains 4 to 40% by weight of amino-functional polyorganosiloxane and 0 to 40% by weight of a dispersant or dispersant mixture.

5. A composition as claimed in claim 1 wherein said dispersion B) contains 10 to 60% by weight of amino-functional polyorganosiloxane and 0 to 10% by weight of a dispersant or dispersant mixture.

6. A composition as claimed in claim 1 wherein both said dispersion A) and said dispersion B) contain a polyorganosiloxane having an unbranched siloxane chain.

7. A composition as claimed in claim 1 wherein in both said dispersion A) and said dispersion B) all silicon atoms in the chain other than the two terminal silicon atoms have attached to them only methyl groups or radicals that contain one or more amino groups.

8. A composition as claimed in claim 1 wherein said dispersion A) is a microemulsion obtained by heating a mixture containing 3 to 25 parts by weight of a water-soluble dispersant and 5 to 96.85 parts by weight of water to a temperature of at least 50 °C. to form a homogeneous phase and adding to said mixture before or after said heating 0.1 to 84 parts by weight of an amino-functional polyorganosiloxane and 0.05 to 3.05 parts by weight of an acid.

9. A composition as claimed in claim 1 wherein said amino-functional polyorganosiloxane present in said dispersion A) and/or said dispersion B) is a linear polysiloxane of the general formula (I)

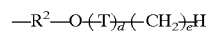

$$R^1(CH_3)_2 Si-O+Si(CH_3)(Y)-(O)\!\!+_z\!\!+Si(CH_3)_2-\\O\!\!+_m\!\!+Si(CH_3)(X)-O\!\!+_n\!Si(CH_3)_2R^1 \qquad (I)$$

where the individual —Si(CH$_3$)(Y)—(O)—, —Si(CH$_3$)$_2$—O— and —Si(CH$_3$)(X)—O— units may have any distribution over the polysiloxane chain, the two R$^1$ radicals are independently OH, R or OR, where R is an alkyl radical of 1 to 6 carbon atoms or a phenyl radical, m, n and z are such that said amino-functional polyorganosiloxane in said dispersion A) has a nitrogen content of at least 0.1% by weight and said amino-functional polyorganosiloxane in said dispersion B) has a nitrogen content of at least 0.01% by weight, Y is a radical of the formula

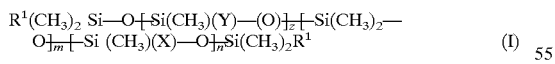

$$-R^2-O+T\!\!+_d\!\!+CH_2\!\!+_e\!H$$

where R$^2$ is a divalent branched or unbranched alkylene radical of 1 to 6 carbon atoms, d is from 5 to 25, e is 0 or 1, and 60 to 100% of all T radicals present represent —CH$_2$CH$_2$—O— and 0 to 40% of all T radicals present represent —CH(CH$_3$)—CH$_2$—O— or —CH$_2$—CH(CH$_3$)—O—

X is a monovalent organic radical that contains one or more amino groups, n is greater than 0 and z is from 0 to m-1.

10. A composition as claimed in claim 9 wherein m in the formula (I) of said polyorganosiloxane in said dispersion A) is at least 20, the m:n ratio is in the range from 20:1 to 150:1 and the m:z ratio is in the range from 20:1 to 500:1 and/or wherein m in said polyorganosiloxane in said dispersion B) is at least 70, the m:n ratio is in the range from 70:1 to 200:1 and the m:z ratio is in the range from 20:1 to 1000:1.

11. A composition as claimed in claim 9 wherein all X radicals present are selected from radicals of the general formulae (II) to (VII)

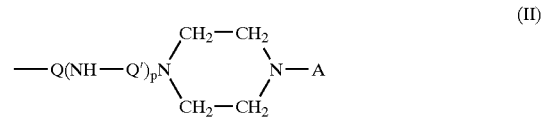

(II)

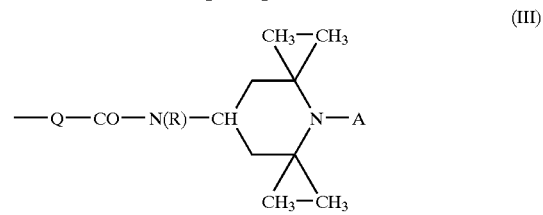

(III)

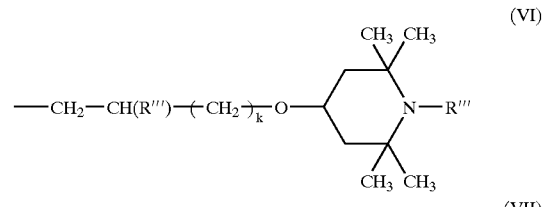

(VI)

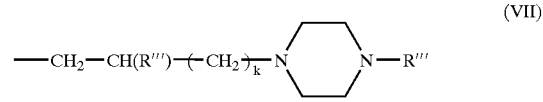

(VII)

where the nitrogenous radicals of these formulae may also be quaternized with an alkyl group of 1 to 8 carbon atoms at one or more of the nitrogen atoms, R is as defined in claim 12, R''' is H or CH$_3$, k is from 0 to 6, t is from 2 to 8, I is from 0 to 3, R$^4$ is H, —CO—(CH$_2$)$_k$OH, —CH$_2$—(CH$_2$)$_k$CH$_3$ or cyclohexyl, A is hydrogen or an alkyl group of 1 to 4 carbon atoms, Q and Q' are each a divalent branched or unbranched alkylene radical of 1 to 4 carbon atoms, p is =0 or 1, and all the Z radicals present are independently hydrogen, an alkyl radical of 1 to 6 carbon atoms with or without one or more hydroxyl groups as substituents, cyclohexyl or the —CO—G radical, where G is an aliphatic radical of 1 to 6 carbon atoms with or without one or more hydroxyl groups as substituents.

12. Method of treating fiber materials which comprises applying a composition as claimed in claim 1 thereto.

13. The method of claim 12 wherein said fiber materials are textile fabrics in the form of wovens, knits or nonwovens.

* * * * *